US010036678B2

(12) United States Patent
Fisher, Jr. et al.

(10) Patent No.: US 10,036,678 B2
(45) Date of Patent: Jul. 31, 2018

(54) AUTOMATED CONTROL OF TOOLFACE WHILE SLIDE DRILLING

(71) Applicant: Ryan Directional Services, Houston, TX (US)

(72) Inventors: Gary Verdean Fisher, Jr., Houston, TX (US); Graham Hunter, Houston, TX (US); Mahmoud Hadi, Richmond, TX (US); Carlos Rolong, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 978 days.

(21) Appl. No.: 14/059,215

(22) Filed: Oct. 21, 2013

(65) Prior Publication Data

US 2015/0107899 A1   Apr. 23, 2015

(51) Int. Cl.
| | |
|---|---|
| *G01L 5/00* | (2006.01) |
| *E21B 49/00* | (2006.01) |
| *E21B 44/00* | (2006.01) |
| *E21B 47/024* | (2006.01) |
| *E21B 7/06* | (2006.01) |

(52) U.S. Cl.
CPC ............ *G01L 5/0004* (2013.01); *E21B 7/068* (2013.01); *E21B 44/005* (2013.01); *E21B 47/024* (2013.01); *E21B 49/003* (2013.01)

(58) Field of Classification Search
CPC ... G01L 5/0004; E21B 44/005; E21B 47/024; E21B 49/003; E21B 7/068
USPC .................................................. 703/1, 9, 10
See application file for complete search history.

(56) References Cited

U.S. PATENT DOCUMENTS

| 6,019,180 | A  | * | 2/2000 | Pafitis ..................... E21B 44/00 |
| | | | | 137/624.18 |
| 7,823,655 | B2 | | 11/2010 | Boone et al. |
| 8,360,171 | B2 | | 1/2013 | Boone et al. |
| 2004/0222023 | A1 | * | 11/2004 | Haci ....................... E21B 7/068 |
| | | | | 175/61 |
| 2005/0096847 | A1 | * | 5/2005 | Huang .................... E21B 44/00 |
| | | | | 702/9 |
| 2009/0090555 | A1 | * | 4/2009 | Boone ..................... E21B 44/02 |
| | | | | 175/45 |

(Continued)

FOREIGN PATENT DOCUMENTS

| CA | 2806681 A1 | 2/2012 |
| WO | WO 2013/000094 A1 | 1/2013 |

OTHER PUBLICATIONS

WIPO, PCT/US2014/060699, "International Search Report," dated Feb. 5, 2015, 4 pages.

(Continued)

*Primary Examiner* — Andre Pierre Louis
(74) *Attorney, Agent, or Firm* — Haynes and Boone, LLP (57) ABSTRACT

Apparatuses, systems, and methods for controlling slide drilling on a drilling rig are described. The methods include detecting current differential pressure of a mud motor and/or weight on bit (WOB) at a surface of a borehole, predicting current reactive torque of the mud motor based on the current differential pressure and/or WOB, and automatically adjusting surface torque and/or angular offset of a tubular adjacent the surface to counteract the current reactive torque and to keep the mud motor at a desired toolface orientation in the borehole.

27 Claims, 4 Drawing Sheets

(56) References Cited

U.S. PATENT DOCUMENTS

| | | | |
|---|---|---|---|
| 2011/0280104 A1* | 11/2011 | McClung, III | E21B 3/02 |
| | | | 367/82 |
| 2012/0018218 A1 | 1/2012 | Rosenhauch | |
| 2012/0024606 A1 | 2/2012 | Pirovolou et al. | |
| 2012/0217067 A1* | 8/2012 | Mebane, III | E21B 44/02 |
| | | | 175/57 |
| 2013/0032407 A1 | 2/2013 | Edbury et al. | |
| 2014/0291023 A1* | 10/2014 | Edbury | E21B 44/00 |
| | | | 175/24 |
| 2015/0184504 A1* | 7/2015 | Ringer | E21B 47/1025 |
| | | | 702/6 |

OTHER PUBLICATIONS

WIPO, PCT/US2014/060699, Written Opinion of the International Searching Authority, dated Feb. 5, 2015, 10 pages.

U.S. Appl. No. 13/708,255, filed Dec. 7, 2012.

\* cited by examiner

AUTOMATED CONTROL OF TOOLFACE WHILE SLIDE DRILLING

TECHNICAL FIELD

The present disclosure relates to apparatuses, systems, and methods for directional drilling, and more specifically sliding with a downhole mud motor.

BACKGROUND OF THE DISCLOSURE

Subterranean "sliding" drilling operation typically involves rotating a drill bit on a downhole motor at the remote end of a drill pipe string during a drilling operation. Drilling fluid forced through the drill pipe and downhole motor rotates the drill bit. The assembly is directed or "steered" from a vertical drill path in any number of directions, allowing the operator to guide the wellbore to desired underground locations. For example, to recover an underground hydrocarbon deposit, the operator may drill a vertical well to a point above the reservoir and then steer the wellbore to drill a deflected or "directional" well that penetrates the deposit. The well may pass horizontally through the deposit. Friction between the drill string and the bore generally increases as a function of the horizontal component of the bore, and slows drilling by reducing the force that pushes the bit into new formations.

Such directional drilling requires accurate orientation of a bent segment of the downhole motor that drives the bit. Rotating the drill string and adjusting the angular position of the pipe at the surface using a top drive or rotary table change the orientation of the bent segment and toolface. To effectively steer the assembly, the operator must first determine the current toolface orientation, such as via measurement-while-drilling (MWD) apparatus. Thereafter, if the drilling direction needs adjustment, the operator must rotate the drill string to change the toolface orientation.

Directional drilling is often performed at the end of a drill string that is several thousand feet in length. Although change of the borehole direction is typically accomplished through a gradual deflection over hundreds of feet or more so that the drill string bends gradually, the friction between the drill string and the borehole generally increases. In addition, the drill string is elastic and stores torsional tension like a spring. Consequently, when an operator makes a static angle adjustment to the drill string at the drilling rig to change the toolface orientation, a substantial portion of the angle adjustment is "absorbed" by the friction without changing the toolface orientation. Thus, the drill string can require more rotation at the surface than the desired rotation of the toolface.

Typically, mechanized drilling systems are controlled by setting limits to either the number of wraps or applied torque by estimating the amount of pipe twist and reactive torque of the bottom hole assembly (BHA). This estimate is used to set the angular position of the pipe at the surface until information from the MWD tool is received on the surface and then additional corrections are made based on the actual bend orientation measured by the MWD tool.

These methods can be slow due to transmission speed of receiving the appropriate downhole data at the surface. When this process is controlled manually by a directional driller, the driller is able to watch the pump pressure and/or weight on bit (WOB) at the surface and determine what the reactive torque of the downhole system will be before bend orientation from downhole is received. Reorienting the toolface in a bore can be very complex, labor intensive, and often inaccurate, and thus, automated methods and systems are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure provides systems and methods that proactively control toolface orientation by using surface standpipe pressure and/or weight on bit (WOB) readings to estimate changes in toolface, due to reactive torque. In particular, reactive torque is predicted based on surface readings, and in one embodiment is predicted based on surface readings without corresponding downhole data. Using surface readings advantageously reduces lag time between receiving data and adjusting the toolface. Thus, adjustments can be made closer to real-time, or in real-time, than using conventional downhole data. Reactive torque is a result of the differential pressure (DP) of the mud motor and/or WOB while sliding. The mud motor tends to turn counterclockwise (or to the left) as the DP of the mud motor or WOB increases. This counterclockwise rotation of the tool downhole is what is meant herein by "reactive torque." Tubular surface torque or angular offset is controlled automatically in real-time by the top drive system and applied to the tubular string to offset the reactive torque and keep the toolface at a desired orientation. The term "tubular" refers to drill pipe, casing, or the like.

In one embodiment, the present disclosure is implemented as a program product for use with a computer system. The program product defines functions of the embodiments (including the methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, writable CD-ROM disks and DVD disks, zip disks, and portable memory devices); and (iii) information conveyed across communications media, (e.g., a computer, telephone, wired network, or wireless network). These embodiments can include information shared over the Internet or other computer networks. Such computer readable media, when carrying computer-readable instructions that perform methods of the invention, represent an exemplary embodiment of the invention.

Further still, in general, software routines implementing embodiments of the present disclosure may be part of an operating system or part of a specific application, component, program, module, object, or sequence of instructions, such as an executable script. Such software routines typically include a plurality of instructions capable of being performed using a computer system, programmable logic controller (PLC), programmable automation controller (PAC), or other type or processor configured to execute instructions read from a computer readable medium. Also, programs typically include or interface with variables, data structures, etc. that reside in a memory or on storage devices as part of their operation. In addition, various programs described herein may be identified based upon the application for which they are implemented. Those of ordinary skill in the art will readily recognize, however, that any particular nomenclature or specific application that follows facilitates a description of the invention and does not limit the invention for use solely with a specific application or nomenclature. Furthermore, the functionality of programs described herein may use a combination of discrete modules or components interacting with one another. Those of ordinary skill in the art will recognize, however, that different embodiments may combine or merge such components and modules in a variety of ways.

Figure 1:
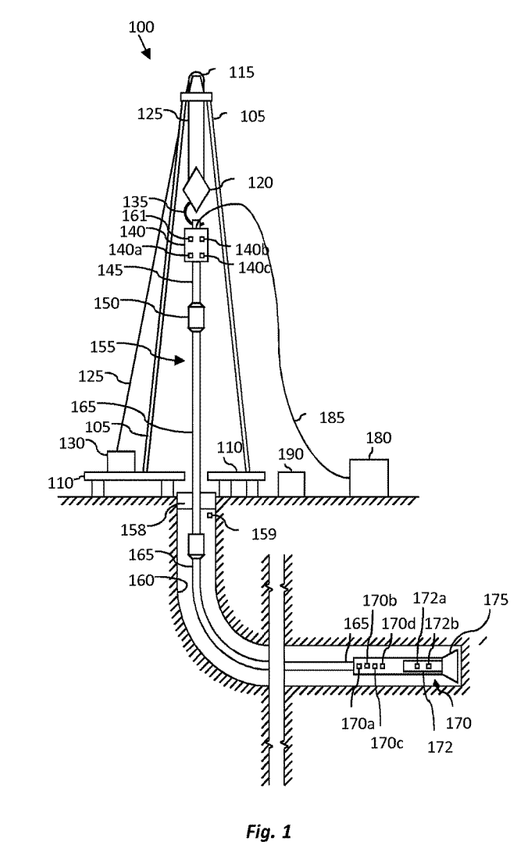
FIG. 1 is a diagram of an apparatus according to one or more aspects of the present disclosure.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. The drilling line 125 extends from the lifting gear to drawworks 130, which is configured to reel out and reel in the drilling line 125 to cause the traveling block 120 to be lowered and raised relative to the rig floor 110.

A hook 135 is attached to the bottom of the traveling block 120. A top drive 140 is suspended from the hook 135. A quill 145 extending from the top drive 140 is attached to a saver sub 150, which is attached to a tubular string 155 suspended within a wellbore 160. Alternatively, the quill 145 may be attached to the tubular string 155 directly.

The tubular string 155 includes interconnected sections of tubular 165, a bottom hole assembly (BHA) 170, and a drill bit 175. The bottom hole assembly 170 may include stabilizers, drill collars, and/or measurement-while-drilling (MWD) or wireline conveyed instruments, among other components. The drill bit 175, which may also be referred to herein as a tool, is connected to the bottom of the BHA 170 or is otherwise attached to the tubular string 155. One or more pumps 180 may deliver fluid to the tubular string 155 through a conduit 185, which may be connected to the top drive 140. The conduit 185 includes a rig standpipe and hose that connect the pumps 180 to the top drive 140. In an embodiment, the rig standpipe includes a sensor to measure surface standpipe pressure. Mud motor DP may be calculated, detected, or otherwise determined at the surface by calculating the difference between the surface standpipe pressure just off-bottom and pressure once the bit touches bottom and starts drilling and experiencing torque. Standpipe pressure sensor 161 may be coupled or otherwise associated with the top drive system 140.

The downhole MWD or wireline conveyed instruments may be configured for the evaluation of physical properties such as pressure, temperature, torque, WOB, vibration, inclination, azimuth, toolface orientation in three-dimensional space, and/or other downhole parameters. These measurements may be made downhole, stored in solid-state memory for some time, and downloaded from the instrument(s) at the surface and/or transmitted to the surface. Data transmission methods may include, for example, digitally encoding data and transmitting the encoded data to the surface, possibly as pressure pulses in the drilling fluid or mud system, acoustic transmission through the tubular string 155, electronically transmitted through a wireline or wired pipe, and/or transmitted as electromagnetic pulses. MWD tools and/or other portions of the BHA 170 may have the ability to store measurements for later retrieval via wireline and/or when the BHA 170 is tripped out of the wellbore 160.

In an exemplary embodiment, the apparatus 100 may also include a rotating blow-out preventer (BOP) 158, such as if the well 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 158. The apparatus 100 may also include a surface casing annular pressure sensor 159 configured to detect the pressure in the annulus defined between, for example, the wellbore 160 (or casing therein) and the tubular string 155.

In the exemplary embodiment depicted in FIG. 1, the top drive 140 is utilized to impart rotary motion to the tubular string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100. In an exemplary embodiment, the controller 190 includes one or more systems located in a control room proximate the apparatus 100, such as the general purpose shelter often referred to as the "doghouse" serving as a combination tool shed, office, communications center and general meeting place. The controller 190 may be configured to transmit the operational control signals to the drawworks 130, the top drive 140, the BHA 170 and/or the pump 180 via wired or wireless transmission means which, for the sake of clarity, are not depicted in FIG. 1.

The controller 190 is also configured to receive electronic signals via wired or wireless transmission means (also not shown in FIG. 1) from a variety of sensors included in the apparatus 100, where each sensor is configured to detect an operational characteristic or parameter. One such sensor is the surface standpipe pressure sensor described above or the WOB sensor 140c described below. The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. In various embodiments, wired/networked drill string sensor data is used to obtain sensor readings for DP, WOB, torque on bit (TOB), or other needed data.

The word "detecting," as used in the context of the present disclosure, may include detecting, sensing, measuring, calculating, and/or otherwise obtaining data. Similarly, the word "detect" in the context of the present disclosure may include detect, sense, measure, calculate, and/or otherwise obtain data.

The apparatus 100 may additionally or alternatively include a shock/vibration sensor 170b that is configured for detecting shock and/or vibration in the BHA 170. The apparatus 100 may additionally or alternatively include a mud motor DP sensor 172a that is configured to detect a pressure differential value or range across one or more motors 172 of the BHA 170. The one or more motors 172 may each be or include a positive displacement drilling motor that uses hydraulic power of the drilling fluid to drive the bit 175, also known as a mud motor. One or more torque sensors 172b may also be included in the BHA 170 for sending data to the controller 190 that is indicative of the torque applied to the bit 175 or TOB by the one or more motors 172.

The apparatus 100 may additionally or alternatively include any available toolface sensor 170c configured to detect the current toolface orientation. The toolface sensor 170c may be or include a conventional or future-developed "magnetic toolface," which detects toolface orientation relative to magnetic north or true north. Alternatively, or additionally, the toolface sensor 170c may be or include a conventional or future-developed "gravity toolface," which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the tubular string 155 (e.g., in response to operational forces acting on the tubular string). The top drive 140 may additionally or alternatively include or otherwise be associated with a speed sensor 140b configured to detect a value or range of the rotational speed of the quill 145.

The top drive 140, draw works 130, crown or traveling block, drilling line or dead line anchor may additionally or alternatively include or otherwise be associated with a WOB sensor 140c (e.g., one or more sensors installed somewhere in the load path mechanisms to detect WOB, which can vary from rig-to-rig) different from the WOB sensor 170d. The WOB sensor 140c may be configured to detect a WOB value or range, where such detection may be performed at the top drive 140, draw works 130, or other component of the apparatus 100.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

FIG. 1 shows an exemplary deviation of the wellbore 160 from a straight path achieved by directional drilling. To properly steer the mud motor 175, an operator terminates rotation of the tubular string 155 and typically determines the toolface orientation, for example, by monitoring data from downhole MWD sensors. The operator then rotates the tubular string 155 through a certain angle to achieve the toolface orientation for the new drilling direction. As the tubular string 155 is held still, the mud motor 175 proceeds at the angle from the end of the tubular string 155. Thus, the wellbore 160 can advance along a curved path. A straight path can again be drilled by resuming continuous rotation of the tubular string 155.

The tubular string 155 acts as a torsional spring with properties determined in part from the string length and stiffness. When the top drive 140 rotates, the tubular string 155 typically "twists" significantly along its length before the end of the tubular string 155 at the downhole motor 175 starts to rotate. The amount of rotation at the top drive 140 necessary to achieve rotation at the downhole motor 175 also varies according to the reactive torque imparted along the length of the tubular string 155.

Figure 2:
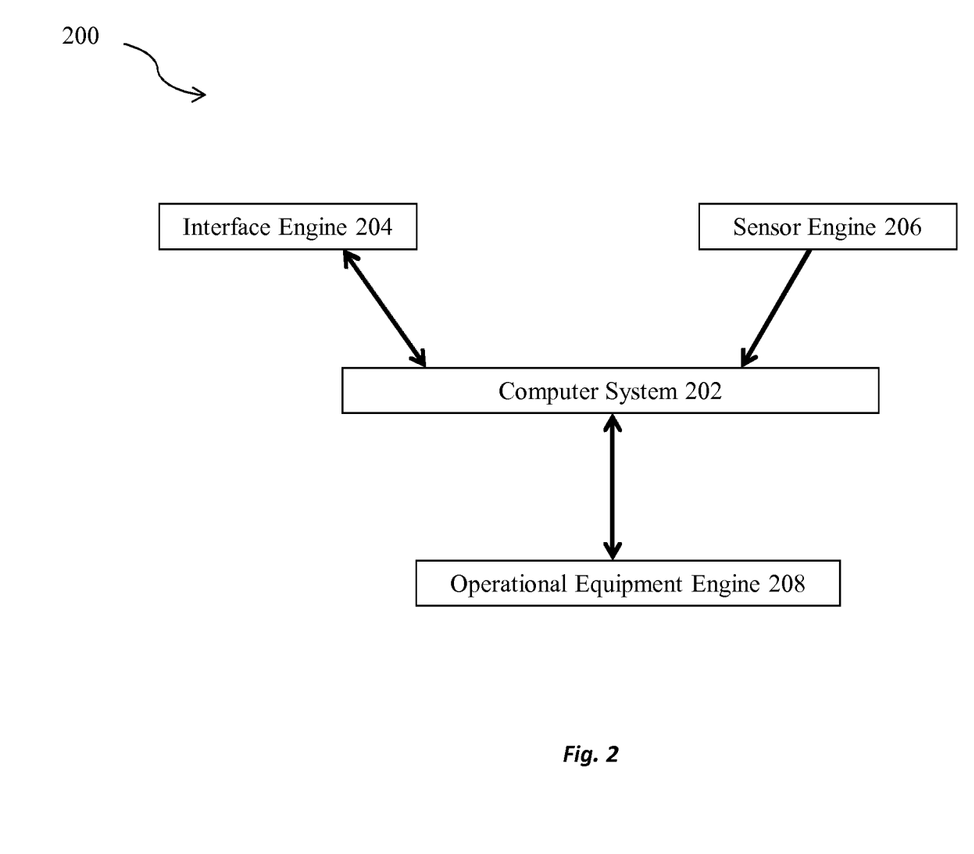
FIG. 2 is a block diagram of a control system according to one or more aspects of the present disclosure.

FIG. 2 illustrates an exemplary schematic diagram of the components of a control system 200 according to one or more aspects of the present disclosure. The exemplary rig control system 200 includes a computer system 202 coupled to an interface engine 204, a sensor engine 206, and an operational equipment engine 208. The term "engine(s)" is meant herein to refer to an agent, instrument, or combination of either, or both, agents and instruments that may be associated to serve a purpose or accomplish a task. Agents and instruments may include sensors, actuators, switches, relays, valves, power plants, system wiring, equipment linkages, specialized operational equipment, computers, components of computers, programmable logic devices, microprocessors, software, software routines, software modules, communication equipment, networks, network services, and other elements and their equivalents, or any combination thereof, which contribute to the purpose or task to be accomplished by the engine.

The interface engine 204 includes at least one input and output device and system that enables an operator or operators to interact with the computer system 202 and the functions that the computer system 202 provides. An exemplary interface engine 204 may have multiple user stations, which may include a video display, a keyboard, a pointing device, a document scanning/recognition device, or other device configured to receive an input from an external source, which may be connected to a software process operating as part of a computer or local area network. The exemplary interface engine 204 may include externally positioned equipment configured to input data (such as operational parameters associated with directional drilling) into the computer system 202. Data entry may be accomplished through various forms, including raw data entry, data transfer, or document scanning coupled with a character recognition process, for example.

The interface engine 204 may include a user station that has a display with touch-screen functionality, so that a driller or operator may receive information from the system 200, and provide input to the system 200 directly via the display or touch screen. Other examples of sub-components that may be part of an interface engine 204 include, but are not limited to, audible alarms, visual alerts, telecommunications equipment, and computer-related components, peripherals, and systems. Sub-components of the interface engine 204 may be positioned in various locations within an area of operation, such as on a drilling rig at a drill site. Sub-components of the interface engine 204 may also be remotely located away from the general area of operation, for example, at a business office, at a sub-contractor's office, in an operations manager's mobile phone, and in a sub-contractor's communication linked personal data appliance. A wide variety of technologies would be suitable for providing coupling of various sub-components of the interface engine 204 to each other and/or to the interface engine 204, and coupling the interface engine 204 itself to the computer system 202. In some embodiments, the operator may thus be remote from the interface engine 204, such as through a wireless or wired internet connection, or a portion of the interface engine 204 may be remote from the rig, or even the wellsite, and be proximate a remote operator, and the portion thus connected through, e.g., an internet connection, to the remainder of the on-site interface engine 204 components.

The sensor engine 206 may include one or more sensing devices, such as sensors (e.g. surface standpipe pressure sensor and WOB sensor 140c), meters, detectors, or other devices, configured to measure or sense a parameter related to a directional drilling specification or a component of a well drilling operation. The sensors or other detection devices are generally configured to sense or detect activity, conditions, and circumstances in an area to which the device has access. These sensors can be located on the surface or downhole, and information transmitted to the surface through a variety of methods. Sub-components of the sensor engine 206 may be deployed at any operational area where information on the execution of directional drilling may occur. Readings from the sensor engine 206 are fed back to the computer system 202. The reported data may include the sensed data, or may be derived, calculated, or inferred from sensed data. Sensed data may be that concurrently collected, recently collected, or historically collected, at that wellsite or an adjacent wellsite.

The computer system 202 receives and processes data from the sensor engine 206 or from other suitable source(s), and monitors the apparatus 100 and conditions on apparatus 100 based on the received data. The computer system 202 may send signals to the sensor engine 206 to adjust the calibration or operational parameters in accordance with a control program in the computer system 202. Additionally, the computer system 202 may generate outputs that control the well drilling operation. In an exemplary embodiment, the computer system 202 directs the top drive 140 to apply a surface torque or angular offset to the tubular string 155 based on surface standpipe pressure readings and/or surface WOB readings.

The operational equipment engine 208 may include a plurality of devices configured to facilitate accomplishment of directional drilling. The operational equipment engine 208 may include hydraulic rams, rotary drives, valves, solenoids, agitators, drives for motors and pumps, control systems, and any other tools, machines, equipment, etc. and other sub-components that would be required to directionally drill the well. The operational equipment engine 208 may be designed to exchange communication with computer system 202, so as to not only receive instructions, but to provide information on the operation of operational equipment engine 208 apart from any associated sensor engine 206. For example, encoders associated with a top drive may provide rotational information regarding a tubular string, and hydraulic links may provide height, positional information, or a change in height or positional information. The operational equipment engine 208 may be configured to receive control inputs from the computer system 202 and to control the well drilling operation (the components conducting the well drilling operation) in accordance with the received inputs from the computer system 202.

Figure 3:
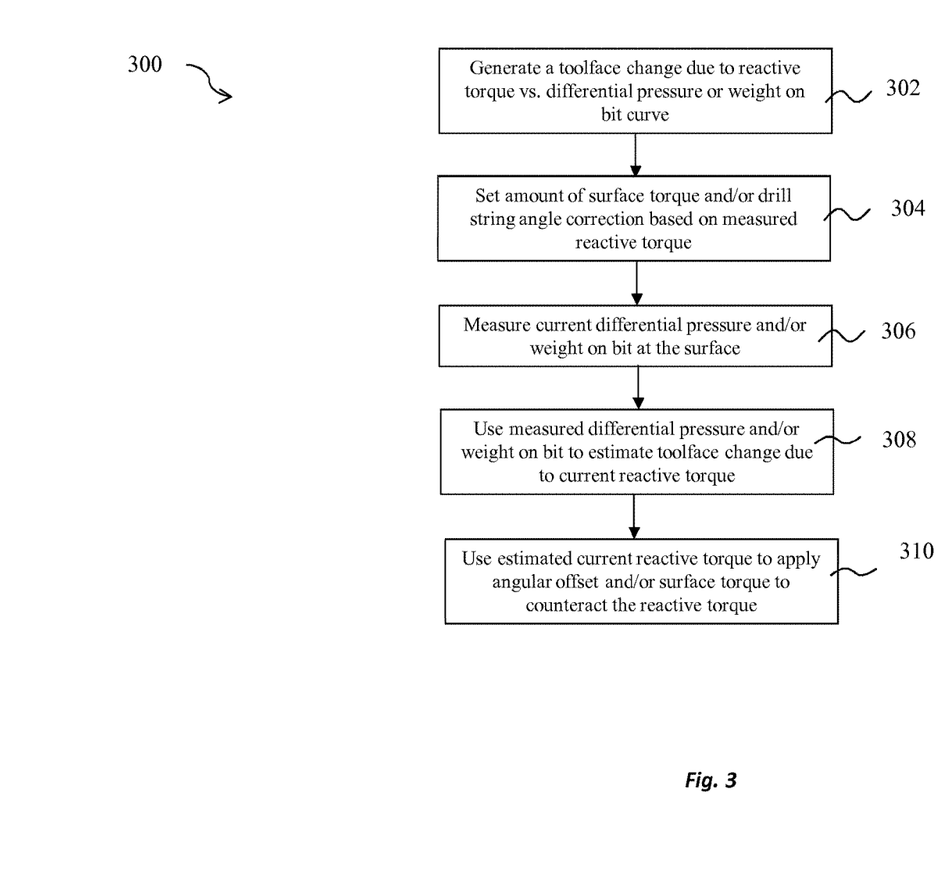
FIG. 3 is a flowchart that illustrates a method of slide drilling according to one or more aspects of the present disclosure.

Turning now to FIG. 3, an exemplary directional drilling process 300 is illustrated. The process 300 starts at step 302 by generating a toolface change due to reactive torque versus DP or WOB curve. In theory, reactive torque is directly proportional to DP and/or WOB, but due to friction and resistance the relationship is usually not linear. To prepare the curve, actual data for the reactive torque, DP and/or WOB must be obtained. For example, readings can be taken from various sensors that detect DP, WOB, and/or reactive torque, or DP, WOB, and/or reactive torque can be calculated from sensor data.

At least two data points should be obtained, and these data points are fitted to a curve. For example, a data point includes a value of DP and the corresponding reactive torque at that DP. In some embodiments, multiple set points are obtained and fitted to a curve. In various embodiments, the DP, WOB, and/or reactive torque values are averaged over a certain period of time. Each value of reactive torque can be plotted against its corresponding DP or WOB value to generate a curve (linear, polynomial, multipoint, best-fit, etc.). The graphed points illustrate a relationship between the DP and/or WOB with the reactive torque. In one embodiment, the relationship can be expressed in an equation or as a mathematical function.

Generally, as the DP or WOB increases, the reactive torque also increases. Due to increasing DP, the reactive torque increases and toolface moves to the left or counterclockwise. As DP decreases, the reactive torque decreases and the toolface moves to the right or counterclockwise. An increasing DP and/or WOB may indicate that the toolface is changing in the opposite direction of the rotation of the tubular string, whereas a decreasing DP and/or WOB may indicate that the toolface is moving in the same direction as the rotation of the tubular string. Thus, data received from DP and WOB sensors can be utilized to control the top drive system to correct any rotation of the tubular string that is indicated by the change in the actual DP and/or WOB. In various embodiments, values of downhole TOB may also be used to adjust toolface.

Various models or curves can be obtained for specific situations and equipment. For example, different curves can be generated for specific mud motors (e.g., size, make/model, etc.), formations (e.g., soft to hard formations), and drill bits (e.g., bit type, bit diameter, bit gauge, bit manufacturer/serial number, etc.). These different models can then be used according to the specific situation, thereby increasing predictability.

At step 304, the amount of torque and/or tubular string angle correction at the surface can be set based on the measured reactive torque values based on the curve generated in step 302. In one embodiment, the torque and angular offset are entered by an operator or, in one embodiment, calculated based on detected data. For example, if the change in toolface due to reactive torque at a specific DP is determined to be 150°, the top drive system can be set to turn the tubular string 150° to the right. As discussed herein, the top drive system will likely need to turn more than 150° at the surface to achieve this rotation downhole, and the computer system is programmed to calculate this relationship, which will change over time, e.g., as the tubular string lengthens and the friction on the string changes.

Once the relationship between DP and/or WOB to reactive torque is known, at step 306, a current DP and/or WOB is measured at the surface. For example, DP of the mud motor can be measured at the surface by using a standpipe pressure sensor, and the WOB can be measured at the surface using a WOB sensor. By using surface readings and avoiding use of downhole data, the toolface can be adjusted from the surface more quickly. In some embodiments, however, values of downhole TOB may also be used to adjust toolface.

At step 308, the measured current DP and/or WOB is used to interpolate or extrapolate the value of the current reactive torque. In an embodiment, the controller 190 takes this value and estimates the value of the current reactive torque based on the previously acquired or measured data points. For example, the value of the DP and/or WOB can be input into a previously obtained equation to output the value of the current reactive torque. A change in the measured DP and/or WOB can indicate a proportional rotation of the toolface orientation in the same or opposite direction.

At step 310, the value of the estimated current reactive torque is used to apply angular offset and/or surface torque to counteract the reactive torque. The toolface can be adjusted at the surface by turning the tubular string. For example, the proper toolface can be maintained by applying torque or tubular string angle corrections to the tubular string at the surface.

Each of the steps of the method 300 may be performed automatically. For example, the controller 190 of FIG. 1 may be configured to automatically generate a curve and determine a relationship between reactive torque and DP and/or WOB, and determine real-time reactive torque using the generated curve. The controller 190 may also be configured to generate and transmit control signals to the top drive 140 that direct the top drive 140 to apply a specific torque or angular offset to the tubular 165.

In an example, a first data point of 200 psi for DP and 270° of change in toolface due to reactive torque, and a second data point of 400 psi and 540° of change in toolface due to reactive torque is measured. The two data points are fitted to a curve. In this example, the DP and reactive torque have a linear relationship. The driller is initially sliding with 400 psi of DP. As the bit takes a bite into the formation, the DP increases to 500 psi. The controller 190 extrapolates reactive torque on the previously acquired curve to predict the value of the reactive torque at 500 psi. In this case, the change in toolface due to reactive torque at 500 psi is estimated to be 635°, and the controller 190 directs the top drive to turn the surface pipe an additional 135° to the right to make the total adjustment to 675° reactive torque.

In some embodiments, signals or data from downhole sensors can be used to further adjust toolface orientation. For instance, current toolface orientation can be measured using a downhole sensor, the current toolface orientation can be compared to the desired toolface orientation, and the toolface can be maintained in place or adjusted until the desired toolface orientation is obtained.

The present disclosure describes methods to counteract the reactive torque generated downhole from the DP of the mud motor and/or WOB. The toolface is proactively controlled by using DP, WOB, or both, to determine the value for the amount of torque, angular offset, or both, to apply at the surface. The methods and systems described herein allow for faster and more proactive control of motor bend orientation, which facilitates maintaining the motor bend orientation or rotating/positioning the motor bend orientation as desired, resulting in a more consistent hole that can be drilled faster.

The present methods and systems use estimated changes in toolface (i.e. reactive torque) to automatically make steering corrections during sliding operations. For example, during sliding without oscillation, angular offset adjustments are made, during sliding with oscillation based on angular position, angular offset adjustments are made, and during sliding with oscillation based on surface rotary torque, left and right torque adjustments are made.

Figure 4:
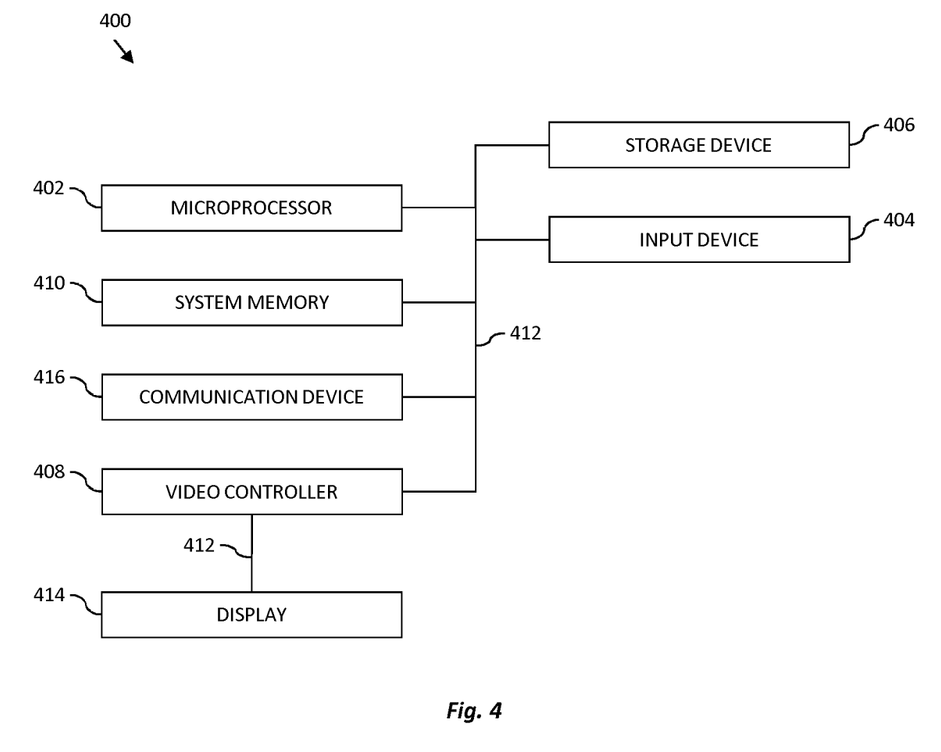
FIG. 4 is a diagram of an apparatus according to one or more aspects of the present disclosure.

Referring to FIG. 4, illustrated is an exemplary system 400 for implementing one or more embodiments of at least portions of the apparatus and/or methods described herein. The system 400 includes a processor 402, an input device 404, a storage device 406, a video controller 408, a system memory 410, a display 414, and a communication device 416, all interconnected by one or more buses 412. The storage device 406 may be a floppy drive, hard drive, CD, DVD, optical drive, or any other form of storage device. In addition, the storage device 406 may be capable of receiving a floppy disk, CD, DVD, or any other form of computer-readable medium that may contain computer-executable instructions. Communication device 416 may be a modem, network card, wireless router, or any other device to enable the system 400 to communicate with other systems.

A computer system typically includes at least hardware capable of executing machine readable instructions, as well as software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, PDAs, and personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. Hardware may also include, at least within the scope of the present disclosure, multi-modal technology, such as those devices and/or systems configured to allow users to utilize multiple forms of input and output—including voice, keypads, and stylus—interchangeably in the same interaction, application, or interface.

Software may include any machine code stored in any memory medium, such as RAM or ROM, machine code stored on other devices (such as floppy disks, CDs or DVDs, for example), and may include executable code, an operating system, as well as source or object code, for example. In addition, software may encompass any set of instructions capable of being executed in a client machine or server—and, in this form, is often called a program or executable code.

Hybrids (combinations of software and hardware) are becoming more common as devices for providing enhanced functionality and performance to computer systems. A hybrid may be created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system herein, and are thus envisioned by the present disclosure as possible equivalent structures and equivalent methods.

Computer-readable mediums may include passive data storage such as a random access memory (RAM), as well as semi-permanent data storage such as a compact disk or DVD. In addition, an embodiment of the present disclosure may be embodied in the RAM of a computer and effectively transform a standard computer into a new specific computing machine.

Data structures are defined organizations of data that may enable an embodiment of the present disclosure. For example, a data structure may provide an organization of data or an organization of executable code (executable software). Furthermore, data signals are carried across transmission mediums and store and transport various data structures, and, thus, may be used to transport an embodiment of the invention. It should be noted in the discussion herein that acts with like names may be performed in like manners, unless otherwise stated.

The controllers and/or systems of the present disclosure may be designed to work on any specific architecture. For example, the controllers and/or systems may be executed on one or more computers, Ethernet networks, local area networks, wide area networks, internets, intranets, hand-held and other portable and wireless devices and networks.

The present disclosure relates to a method of slide drilling. The method includes detecting current differential pressure of a mud motor, weight on bit (WOB), or both, adjacent a surface of a borehole, predicting current reactive torque of the mud motor based on either the measured current differential pressure in the borehole, the WOB, or both, and automatically adjusting surface torque, angular offset, or both of a tubular adjacent the surface to counteract the current reactive torque and to position the mud motor at a desired toolface orientation in the borehole.

The present disclosure further relates to a control system configured to perform slide drilling. The control system includes a computer system, a sensor engine, and an operational equipment engine. The computer system is configured to predict current reactive torque of a mud motor based on current differential pressure, weight on bit (WOB) values, or both. The sensor engine is in communication with the computer system and configured to sense the current differential pressure, WOB, or both, adjacent a surface of a borehole. The operational equipment engine is in communication with the computer system and is configured to receive input from the computer system to automatically adjust surface torque, angular offset, or both of a tubular adjacent to the surface to counteract the current reactive torque and to position the mud motor at a desired toolface orientation in the borehole.

Moreover, the present disclosure relates to a non-transitory computer-readable medium configured to extend a borehole with a rig that includes a plurality of computer-readable instructions which, when executed by one or more processors, are configured to cause the one or more processors to perform a method. The method includes predicting current reactive torque of a mud motor based on current differential pressure, weight on bit (WOB), or both measured adjacent a surface portion of a borehole and automatically adjusting surface torque, angular offset, or both of a tubular adjacent to the surface to counteract the reactive torque and to position the mud motor at a desired toolface orientation in the borehole.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims. It should also be understood that use of "and/or" herein refers to any of, or all of, the listed items.

Moreover, it is the express intention of the applicant not to invoke 35 U.S.C. § 112(f) for any limitations of any of the claims herein, except for those in which the claim expressly uses the word "means" together with an associated function.

What is claimed is:

1. A method of slide drilling, which method comprises:
   determining, with a controller, using surface readings obtained adjacent a surface of a borehole, current differential pressure of a mud motor determined by calculating a difference between a measured off-bottom surface standpipe pressure and a measured on-bottom surface standpipe pressure, weight on bit (WOB) determined by a surface WOB sensor, or both;
   predicting, with the controller, using the surface readings obtained adjacent the surface of the borehole, current downhole reactive torque of the mud motor based on a first predetermined relationship with either the determined current differential pressure, the WOB, or both, wherein the current downhole reactive torque is generated by sliding and causes a change in toolface orientation from a desired toolface orientation;
   determining, with the controller, a downhole length of the tubular string;
   determining, with the controller, based on a second predetermined relationship with the predicted current downhole reactive torque, the downhole length of the tubular string and a change of friction in the tubular string, a specific amount of surface torque, angular offset, or both to apply to a tubular adjacent the surface to counteract the current downhole reactive torque to correct for the change in toolface orientation caused by the current downhole reactive torque and to position the mud motor at the desired toolface orientation in the borehole;

generating and sending, with the controller, a control signal to a top drive to apply the specific amount of surface torque, angular offset, or both to the tubular; and controlling, via the control signal, the top drive to apply the specific amount of surface torque, angular offset, or both to the tubular.

2. The method of claim 1, wherein the first predetermined relationship differs in response to a mud motor used, formation drilled, drill bit used, or combination thereof.

3. The method of claim 1, wherein the first predetermined relationship is determined by fitting data points to a curve.

4. The method of claim 3, wherein the predicting the current downhole reactive torque further comprises using the curve to interpolate or extrapolate the current downhole reactive torque based on the current differential pressure, WOB, or both.

5. The method of claim 2, further comprising selecting a specific first predetermined relationship from a plurality of predetermined relationships in response to the formation drilled, drill bit used, mud motor used, or a combination thereof.

6. The method of claim 5, wherein the plurality of predetermined relationships are determined by fitting measured differential pressure data, WOB, or both and reactive torque data to a curve for each of the different formations, drill bits, mud motors, or a combination thereof.

7. The method of claim 1, wherein determining the current differential pressure, WOB, or both further comprises measuring surface standpipe pressure, WOB, or both, at predetermined time intervals.

8. A method of slide drilling, which method comprises:
determining, with a controller using surface readings obtained adjacent a surface of a borehole to reduce lag time between receiving sensed or calculated data and adjusting a drilling toolface, current differential pressure of a mud motor determined by calculating a difference between a measured off-bottom surface standpipe pressure and a measured on-bottom surface standpipe pressure, weight on bit (WOB) determined by a surface WOB sensor, or both;

predicting, within the controller using the surface readings obtained adjacent the surface of the borehole, current downhole reactive torque of the mud motor based on a first predetermined relationship with either the determined current differential pressure, the WOB, or both, wherein the current downhole reactive torque is generated by sliding and causes a change in toolface orientation from a desired toolface orientation;

determining, with the controller, a downhole length of the tubular string;

determining, with the controller, based on a second predetermined relationship with the predicted current downhole reactive torque, the downhole length of the tubular string and a change of friction in the tubular string, a specific amount of surface torque, angular offset, or both, to apply to of a tubular adjacent the surface to counteract the current downhole reactive torque to correct for the change in toolface orientation caused by the current downhole reactive torque and to position the mud motor at the desired toolface orientation in the borehole;

generating and sending, with the controller, a control signal to a top drive to apply the specific amount of surface torque, angular offset, or both to the tubular; and controlling, via the control signal, the top drive to apply the specific amount of surface torque, angular offset, or both to the tubular.

9. The method of claim 8, wherein the first predetermined relationship differs in response to a mud motor used, formation drilled, drill bit used, or combination thereof.

10. The method of claim 9, further comprising selecting a specific first predetermined relationship from a plurality of predetermined relationships in response to the formation drilled, drill bit used, mud motor used, or a combination thereof.

11. The method of claim 10, wherein the plurality of first predetermined relationships are determined by fitting measured differential pressure data, WOB, or both and reactive torque data to a curve for each of the different formations, drill bits, mud motors, or a combination thereof.

12. The method of claim 8, wherein the first predetermined relationship is determined by fitting data points to a curve.

13. The method of claim 12, wherein the predicting the current downhole reactive torque further comprises using the curve to interpolate or extrapolate the current downhole reactive torque based on the current differential pressure, WOB, or both.

14. A control system configured to perform slide drilling comprising:
a computer system configured to predict, using surface readings obtained adjacent a surface of a borehole, current downhole reactive torque of a mud motor based on a first predetermined relationship with current differential pressure determined by calculating a difference between a measured off-bottom surface standpipe pressure and a measured on-bottom surface standpipe pressure, weight on bit (WOB) values determined by a surface WOB sensor, or both, wherein the current downhole reactive torque is generated by sliding and causes a change in toolface orientation from a desired toolface orientation;

a sensor engine in communication with the computer system, the sensor engine being configured to sense the surface readings of the current differential pressure, WOB, or both, adjacent the surface of the borehole; and an operational equipment engine in communication with the computer system, the operational equipment engine being configured to receive input from the computer system to:

determine, with a controller, a downhole length of the tubular string;

determine, based on a second predetermined relationship with the predicted current downhole reactive torque, the downhole length of the tubular string and a change of friction in the tubular string, a specific amount of surface torque, angular offset, or both, of a tubular adjacent the surface to counteract the current downhole reactive torque to correct for the change in toolface orientation caused by the current downhole reactive torque and to position the mud motor at the desired toolface orientation in the borehole;

generate and send a control signal to a top drive to apply the specific amount of surface torque, angular offset, or both to the tubular; and control, via the control signal, the top drive to apply the specific amount of surface torque, angular offset, or both to the tubular.

15. The control system of claim 14, wherein the computer system is configured to predict current downhole reactive torque using previously measured differential pressure data, WOB, or both and reactive torque data from the sensor engine.

16. The control system of claim 15, wherein the computer system is further configured to fit the previously measured differential pressure data, WOB, or both and reactive torque data to a curve.

17. The control system of claim 16, wherein the computer system is further configured to use the curve to estimate the current downhole reactive torque based on the current differential pressure, WOB, or both.

18. The control system of claim 14, wherein the computer system is further configured to predict the current downhole reactive torque for different formations, drill bits, mud motors, or combinations thereof.

19. The control system of claim 14, wherein the sensor engine is configured to detect the current differential pressure, WOB, or both, by measuring surface standpipe pressure, WOB, or both, at predetermined time intervals.

20. The control system of claim 14, wherein the the first predetermined relationship differs in response to a mud motor used, formation drilled, drill bit used, or combination thereof.

21. The control system of claim 14, wherein the operational equipment engine is further configured to:
    determine a downhole length of the tubular, wherein the specific amount of surface torque, angular offset, or both is determined based additionally on the downhole length of the tubular.

22. A non-transitory computer-readable medium configured to extend a borehole with a rig comprising a plurality of computer-readable instructions which, when executed by one or more processors, are configured to cause the one or more processors to perform a method which comprises:
    predicting, using surface readings measured adjacent a surface of a borehole, current downhole reactive torque of a mud motor based on a first predetermined relationship with current differential pressure determined by calculating a difference between a measured off-bottom surface standpipe pressure and a measured on-bottom surface standpipe pressure, weight on bit (WOB) determined by a surface WOB sensor, or both, wherein the current downhole reactive torque is generated by sliding and causes a change in toolface orientation from a desired toolface orientation;
    determining, with a controller, a downhole length of the tubular string;
    determining, based on a second predetermined relationship with the predicted current downhole reactive torque, the downhole length of the tubular string and a change of friction in the tubular string, a specific amount of surface torque, angular offset, or both to apply to of a tubular adjacent the surface to counteract the current downhole reactive torque to correct for the change in toolface orientation caused by the current downhole reactive torque and to position the mud motor at the desired toolface orientation in the borehole;
    generating and sending a control signal to a top drive to apply the specific amount of surface torque, angular offset, or both to the tubular; and
    controlling, via the control signal, the top drive to apply the specific amount of surface torque, angular offset, or both to the tubular.

23. The non-transitory computer-readable medium of claim 22, wherein the first predetermined relationship differs in response to a mud motor used, formation drilled, drill bit used, or combination thereof.

24. The non-transitory computer-readable medium of claim 22, wherein the first predetermined relationship is determined by fitting data points to a curve.

25. The non-transitory computer-readable medium of claim 24, wherein the predicting the current downhole reactive torque further comprises using the curve to interpolate or extrapolate the current downhole reactive torque.

26. The non-transitory computer-readable medium of claim 23, wherein the method further comprises:
    selecting a specific first predetermined relationship from a plurality of predetermined relationships in response to the formation drilled, drill bit used, mud motor used, or a combination thereof.

27. The non-transitory computer-readable medium of claim 26, wherein the plurality of predetermined relationships are determined by fitting measured differential pressure data, WOB, or both and reactive torque data to a curve for each of the different formations, drill bits, mud motors, or a combination thereof.

* * * * *

UNITED STATES PATENT AND TRADEMARK OFFICE
CERTIFICATE OF CORRECTION

PATENT NO. : 10,036,678 B2
APPLICATION NO. : 14/059215
DATED : July 31, 2018
INVENTOR(S) : Gary Verdean Fisher, Jr. et al.

Page 1 of 1

It is certified that error appears in the above-identified patent and that said Letters Patent is hereby corrected as shown below:

In the Claims

Claim 20 at Column 15, Line 25: Please change "wherein the the first" to --wherein the first--

Signed and Sealed this
Eighteenth Day of September, 2018

Andrei Iancu
*Director of the United States Patent and Trademark Office*